(12) United States Patent
Conti et al.

(10) Patent No.: US 10,521,751 B2
(45) Date of Patent: Dec. 31, 2019

(54) USING CUSTOMER PROFILING AND ANALYTICS TO UNDERSTAND, RANK, SCORE, AND VISUALIZE BEST PRACTICES

(71) Applicant: International Business Machines Corporation, Armonk, NY (US)

(72) Inventors: Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 217 days.

(21) Appl. No.: 15/259,104

(22) Filed: Sep. 8, 2016

(65) Prior Publication Data

US 2018/0068249 A1 Mar. 8, 2018

(51) Int. Cl.
*G06F 11/36* (2006.01)
*G06Q 10/06* (2012.01)

(52) U.S. Cl.
CPC ... *G06Q 10/06393* (2013.01); *G06F 11/3664* (2013.01); *G06F 11/3668* (2013.01)

(58) Field of Classification Search
CPC  G06F 17/30; G06F 1/00; G06F 21/00; G06Q 10/00; G06Q 99/00
USPC .............................................. 705/7.11, 7.42
See application file for complete search history.

(56) References Cited

U.S. PATENT DOCUMENTS

| | | | |
|---|---|---|---|
| 5,881,238 A | 3/1999 | Aman et al. | |
| 6,167,427 A | 12/2000 | Rabinovich et al. | |
| 6,351,775 B1 | 2/2002 | Yu | |
| 6,981,180 B1 | 12/2005 | Bailey et al. | |
| 7,003,504 B1 * | 2/2006 | Angus | G06F 16/254 |
| 7,080,378 B1 | 7/2006 | Noland et al. | |
| 7,475,157 B1 | 1/2009 | Tormasov | |
| 7,561,988 B2 | 7/2009 | Matsunaga et al. | |

(Continued)

FOREIGN PATENT DOCUMENTS

WO  WO-2015051177 A1 * 4/2015 ........... G06F 16/955

OTHER PUBLICATIONS

Fan, Shaokun & Y.K. Lau, Raymond & Leon Zhao, J. (2015). Demystifying Big Data Analytics for Business Intelligence Through the Lens of Marketing Mix. Big Data Research. 2. 10.1016/j.bdr. 2015.02.006. (Year: 2015).*

(Continued)

*Primary Examiner* — Alan S Miller
*Assistant Examiner* — Jay-Ming Wang
(74) *Attorney, Agent, or Firm* — Cantor Colburn LLP; William Kinnaman

(57) ABSTRACT

Aspects of the present invention include a method, system and computer program product for understanding, ranking, scoring and visualizing customer implementation of best practices. The method includes the processor performing an accounting of metrics relating to best practices implementation categories; determining one or more formulas that assign a score to each of the metrics relating to best practices implementation categories; acquiring relative customer best practices data; determining a score for each one of the best practices implementation categories; and determining a ranking for each one of the best practices implementation categories in relation to the acquired relative customer best practices data.

14 Claims, 5 Drawing Sheets

(56) References Cited

U.S. PATENT DOCUMENTS

| | | | |
|---|---|---|---|
| 7,720,955 B1 | 5/2010 | Kelly et al. | |
| 7,860,097 B1 | 12/2010 | Lovett et al. | |
| 8,024,615 B2 | 9/2011 | Tarta | |
| 8,200,527 B1* | 6/2012 | Thompson | G06Q 10/0639 |
| | | | 705/7.39 |
| 8,417,715 B1 | 4/2013 | Bruckhaus et al. | |
| 8,781,977 B1 | 7/2014 | Huberman et al. | |
| 8,850,270 B2 | 9/2014 | Heiper et al. | |
| 9,317,407 B2 | 4/2016 | Sabin et al. | |
| 9,727,448 B1 | 8/2017 | Seibert, Jr. et al. | |
| 9,846,881 B2 | 12/2017 | Greene et al. | |
| 10,019,167 B2 | 7/2018 | Gray | |
| 2001/0013008 A1 | 8/2001 | Waclawski | |
| 2002/0156663 A1 | 10/2002 | Weber et al. | |
| 2002/0170022 A1 | 11/2002 | Shirai et al. | |
| 2004/0044744 A1 | 3/2004 | Grosner et al. | |
| 2005/0187990 A1 | 8/2005 | Pace | |
| 2006/0095311 A1 | 5/2006 | Thompson | |
| 2007/0022426 A1 | 1/2007 | Steinder et al. | |
| 2007/0276871 A1 | 11/2007 | Fu et al. | |
| 2008/0028409 A1 | 1/2008 | Cherkasova | |
| 2008/0189350 A1 | 8/2008 | Vasa et al. | |
| 2012/0095956 A1 | 4/2012 | Xiong et al. | |
| 2012/0110589 A1 | 5/2012 | Ghosh et al. | |
| 2012/0131104 A1 | 5/2012 | Beaven et al. | |
| 2013/0007126 A1 | 1/2013 | Ziemann | |
| 2013/0073473 A1* | 3/2013 | Heath | G06Q 30/02 |
| | | | 705/319 |
| 2013/0162444 A1 | 6/2013 | Boulanger et al. | |
| 2013/0185021 A1 | 7/2013 | Addison et al. | |
| 2013/0212264 A1 | 8/2013 | Troppens et al. | |
| 2014/0033055 A1* | 1/2014 | Gardner | H04L 41/22 |
| | | | 715/736 |
| 2014/0109002 A1 | 4/2014 | Kimball | |
| 2014/0337429 A1 | 11/2014 | Asenjo et al. | |
| 2014/0344787 A1 | 11/2014 | Cochrane et al. | |
| 2015/0032691 A1 | 1/2015 | Hall et al. | |
| 2015/0046363 A1 | 2/2015 | McNamara et al. | |
| 2015/0113162 A1 | 4/2015 | Chan et al. | |
| 2015/0317337 A1* | 11/2015 | Edgar | G06Q 10/00 |
| | | | 707/751 |
| 2015/0363348 A1 | 12/2015 | Haynes | |
| 2016/0188370 A1 | 6/2016 | Razin et al. | |
| 2016/0224392 A1 | 8/2016 | Clarke et al. | |
| 2016/0231999 A1 | 8/2016 | Holler et al. | |
| 2017/0250885 A1 | 8/2017 | Donovan | |
| 2018/0284756 A1 | 10/2018 | Cella et al. | |

OTHER PUBLICATIONS

Dias, "Make the Azure Portal Dashboard your own", Nov. 30, 2015, 7 pages.

Yu, "Understanding User Behavior in Large-Scale Video-on-Demand Systems," Apr. 2006, ACM, pp. 333-344.

* cited by examiner

… (1)

USING CUSTOMER PROFILING AND ANALYTICS TO UNDERSTAND, RANK, SCORE, AND VISUALIZE BEST PRACTICES

BACKGROUND

The present invention relates to the testing of software, hardware, firmware, and/or other disciplines, and more specifically, to a method, system and computer program product that implement aspects of workload and operational profiling, coupled with business analytics, thereby resulting in improvements in the testing of customer software.

In the field of software testing, as in many other technical fields, improvements are constantly being sought, primarily for cost and accuracy reasons. A fundamental goal of software testing, in theory, is to identify all of the problems in a customer's software program before the program is released for use by the customer. However, in reality, this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes performing, by a processor, an accounting of metrics relating to best practices implementation categories; determining, by the processor, one or more formulas that assign a score to each of the metrics relating to best practices implementation categories; and acquiring, by the processor, relative customer best practices data. The method also includes determining, by the processor, a score for each one of the best practices implementation categories; and determining, by the processor, a ranking for each one of the best practices implementation categories in relation to the acquired relative customer best practices data.

According to another embodiment of the present invention, a system includes a processor in communication with one or more types of memory, the processor configured to perform an accounting of metrics relating to best practices implementation categories; to determine one or more formulas that assign a score to each of the metrics relating to best practices implementation categories; and to acquire relative customer best practices data. The processor is also configured to determine a score for each one of the best practices implementation categories; and to determine a ranking for each one of the best practices implementation categories in relation to the acquired relative customer best practices data.

According to yet another embodiment of the present invention, a computer program product includes a non-transitory storage medium readable by a processing circuit and storing instructions for execution by the processing circuit for performing a method that includes performing, by a processor, an accounting of metrics relating to best practices implementation categories; determining, by the processor, one or more formulas that assign a score to each of the metrics relating to best practices implementation categories; and acquiring, by the processor, relative customer best practices data. The method also includes determining, by the processor, a score for each one of the best practices implementation categories; and determining, by the processor, a ranking for each one of the best practices implementation categories in relation to the acquired relative customer best practices data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
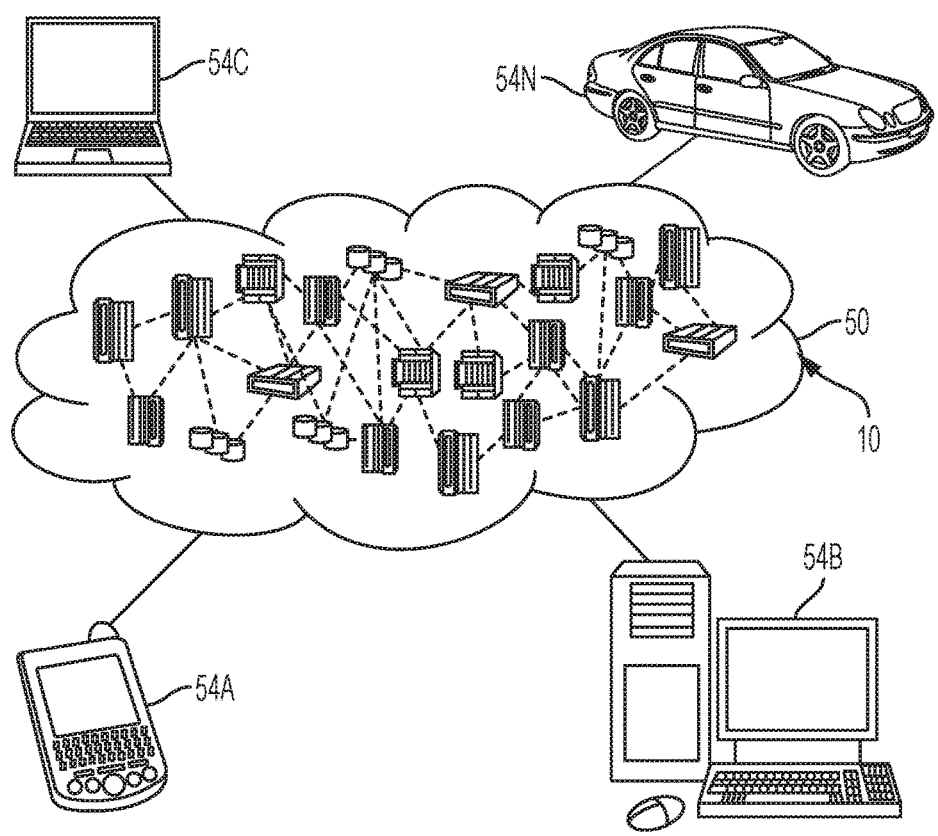
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
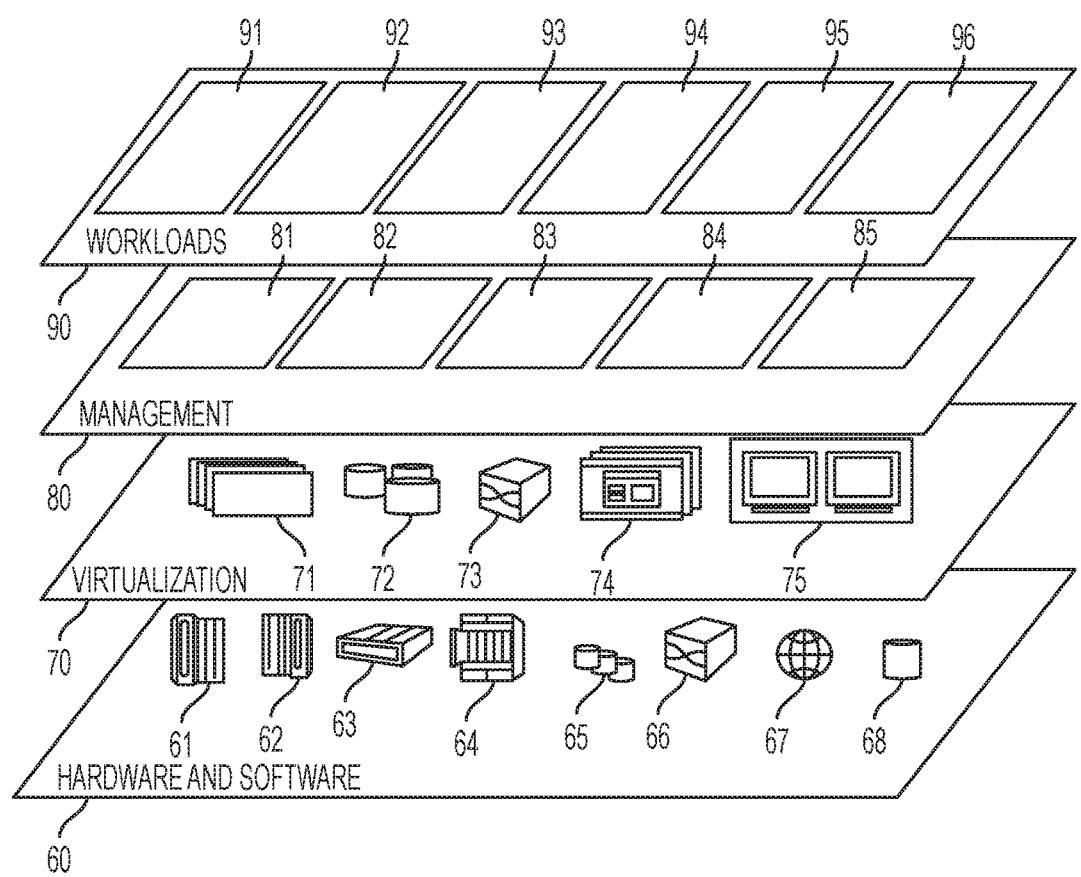
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for understanding, ranking, scoring and visualizing customer implementation of best practices in accordance with one or more embodiments of the present invention.

Figure 3:
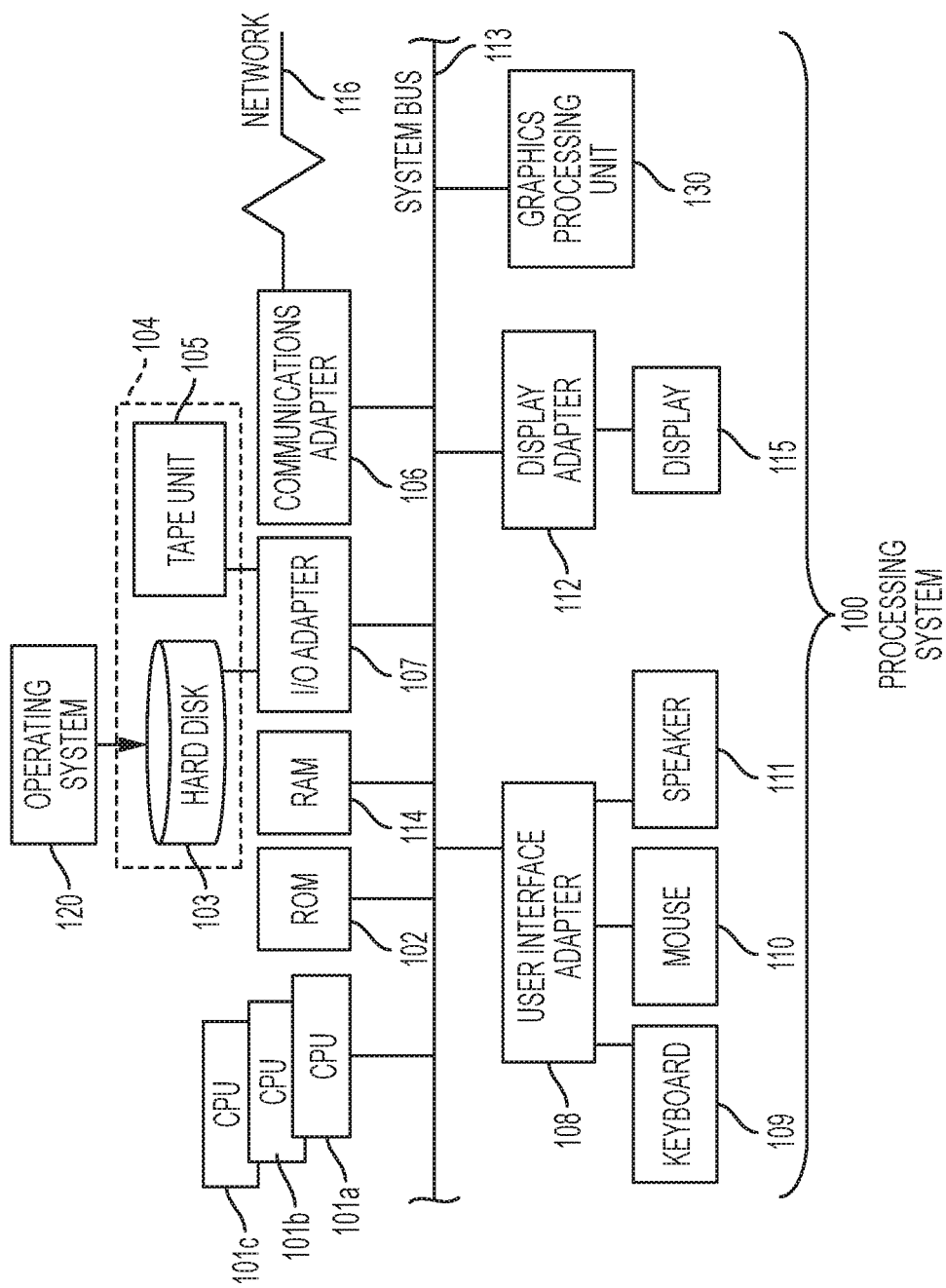
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for understanding, ranking, scoring and visualizing customer implementation of best practices.

Figure 4:
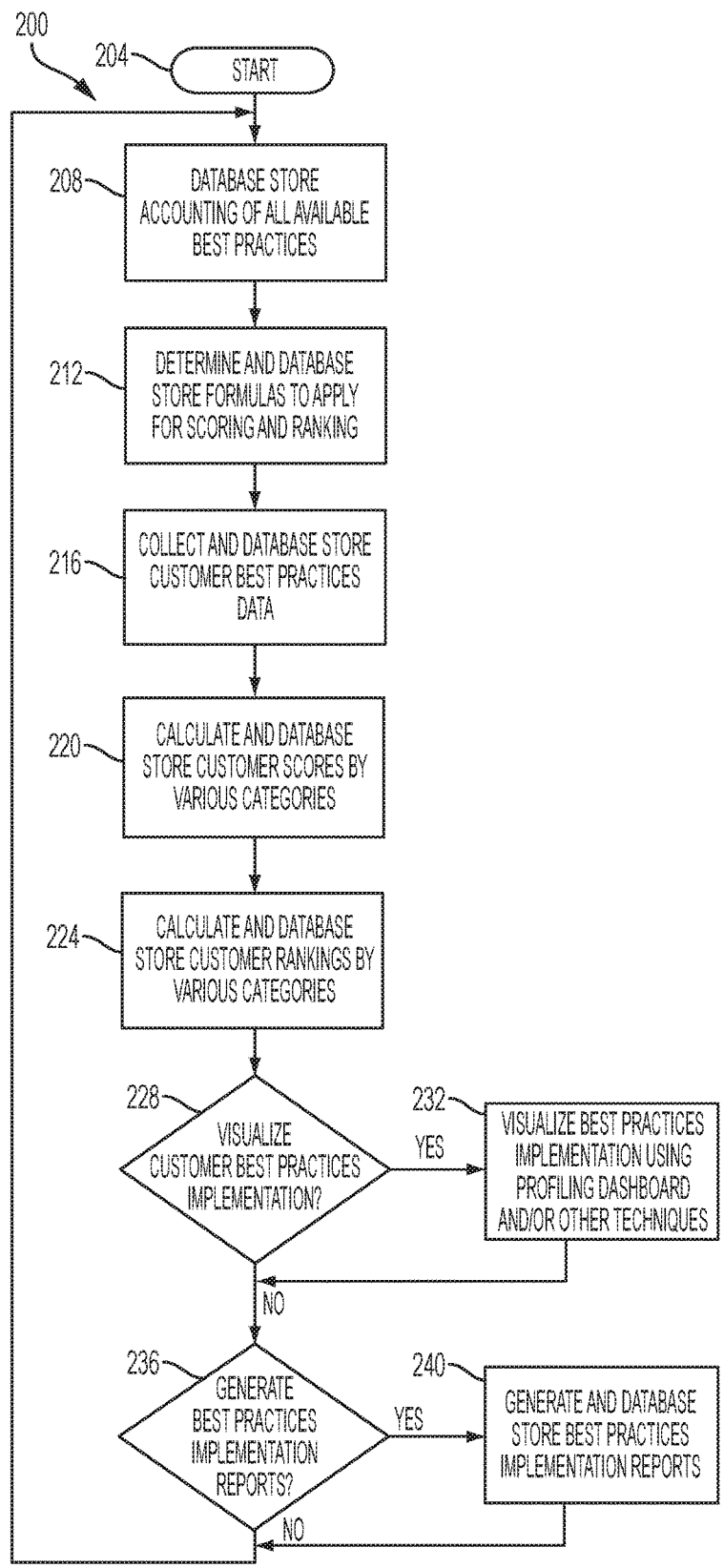
FIG. 4 is a flow diagram of a method for understanding, ranking, scoring and visualizing customer implementation of best practices in accordance with one or more embodiments of the present invention.

With reference now to FIG. 4, a flow diagram illustrates a method 200 according to one or more embodiments of the present invention for understanding, ranking, scoring and visualizing customer implementation of best practices. Specific embodiments relate to customer implementation of IBM System z disciplines' best practices. However, other types of best practices are contemplated by various embodiments of the present invention. This invention can be generalized and extended to other IBM and other businesses' Information Technology (IT) disciplines, non-IT disciplines, and to non-IT industries' disciplines.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

After a start operation in block 204, an operation in block 208 takes or performs an accounting of all best practices implementation data in categories, including, for example, from each operational, environmental, workload, application, and/or functional areas to be analyzed. Included may be various customer categories or groupings by geography, country, continent, industry, etc., and through multiple metrics or factors with multiple categories and scores and to determine or calculate an overall value for a best practices implementation score or grade. The metrics or factors may be stored in a best practices accounting database 310 (FIG. 5).

Figure 5:
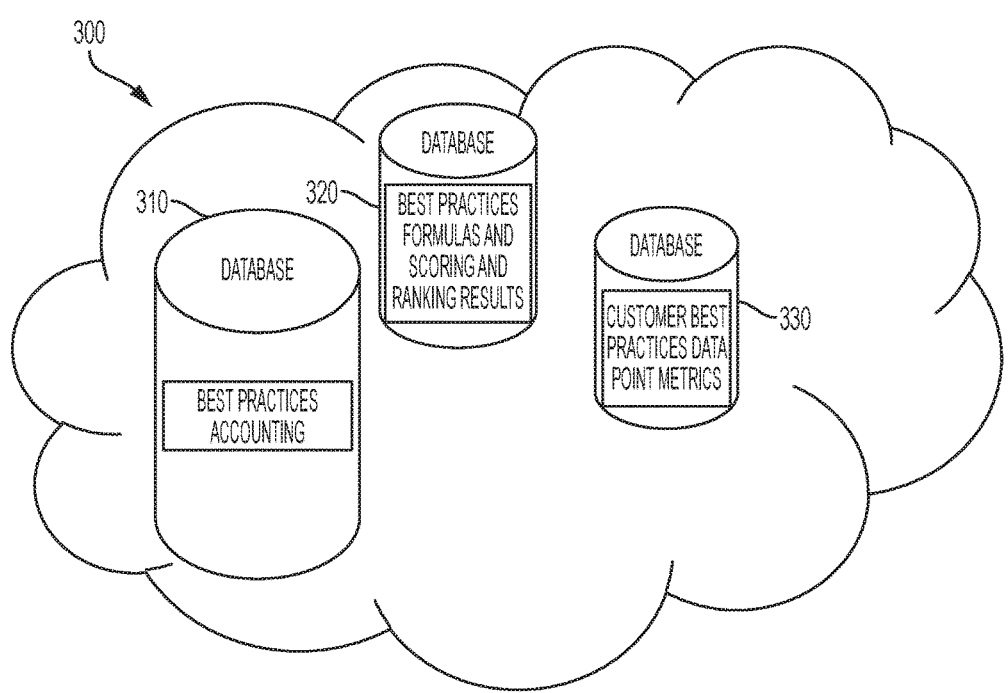
FIG. 5 is a diagram of various databases residing in a cloud computing environment in accordance with one or more embodiments of the present invention.

Referring also to FIG. 5, in embodiments of the present invention, the best practices accounting database 310 may be one of a plurality of databases, or a portion of a single database, that reside within a cloud environment 300, which may be similar in various aspects to the cloud computing environment 50 of FIG. 1. A best practices value weighting may be established during best practices accounting and for storage into the best practices accounting database 310. The best practices data points stored in the database 310 may be related by customer categories or groupings including by geography, country, continent, industry, etc., from each operational, environmental, workload, application, and/or functional areas to be analyzed.

In an operation in block 212, through consultation with subject matter experts (SME) from each operational, environmental, workload, application, and/or functional areas to be analyzed for best practices implementation, determine the necessary formulas to properly score and rank these best practices implementations. When customer best practices metrics are collected, simple or complex analysis may be accomplished by scoring and ranking the adoption and adherence to particular best practices using these formulas. These formulas may be stored in a database 320 (FIG. 5) as a preparation or prerequisite for analytics processing.

In an operation in block 216, the relative customer best practices data is acquired using the current and continually expanding customer profiling and analytics discipline techniques for data collection and curation, including environment, workload and operational questionnaires, interviews, workshops, deep dives, problem history analysis, social and traditional media analysis, empirical data analysis, and more. This customer best practices data may be stored in a database 330 (FIG. 5) as a preparation or prerequisite for analytics processing. The best practices results from the operation in block 216 may be visualized using a graphical dashboard display.

In an operation in block 220, the customer best practices implementation scores are determined or calculated for each operational, environmental, workload, application, and/or functional areas to be analyzed. These customer best practices scores may be stored in the database 330.

In an operation in block 224, the customer best practices implementation ranking are determined or calculated for each operational, environmental, workload, application, and/or functional areas to be analyzed in relation to various previously collected customer best practices implementation data and through a variety of customer groupings. These customer groupings may include by geography, country, culture, industry, etc. as well as the overall global customer set. These customer best practices rankings may be stored in the database 320.

Next, a decision operation in block 228 decides whether or not to visualize the customer best practices implementation of this iteration of the method 200. If so, an operation in block 232 visually presents to the user the best practices implementation data and observations, formulas, scores, and/or rankings in a relatively highly intuitive, customizable, negotiable, descriptive, and flexible dashboard type interface.

Next (or if the decision operation in block 228 decides not to visualize the customer best practices implementation of this iteration of the method 200), a decision operation in block 236 decides whether or not to generate one or more reports for this iteration's customer best practices implementation. If not, the method 200 branches back to the operation in block 208 to reiterate customer profiling and analytics of customer best practices implementation as available best practices are maintained.

If so, in an operation in block 240 the best practices implementation data and observations, formulas, scores, and/or rankings are presented in a highly intuitive, customizable, negotiable, descriptive, and flexible canned and/or end user designed and generated reports. These customer best practices report specifications and data may be stored in the database 320, for, e.g., current and/or future statistical analyses and for current and/or future time series observations and analyses. The method 200 then branches back to the operation in block 208 to reiterate customer profiling and analytics of customer best practices implementation as available best practices are maintained.

Embodiments of the present invention utilize a relatively wide and diverse range of IBM System z disciplines' best practices metrics to score or rank customer's System z environments, configurations and/or workloads. All IBM System z disciplines' best practices and customer data, including the score and rank information, may be stored in databases, driven by business analytics, and visualized with, e.g., Java Web applications.

In embodiments, the best practices customer score and rank information is used to determine the current degree to which the individual customer has adopted or implemented IBM best practices across a wide range of disciplines. Also, with the IBM best practices and customer data stored in databases and continually updated as relevant practices and/or customer adoption changes, embodiments of the present invention can generate current and future statistics on customer best practices adoptions, determine trends, and generate time series observations. Further, with a relatively high degree of flexibility to analyze a wide and diverse range of IBM System z disciplines' best practices, now and on an ongoing basis, embodiments can remain relevant and usable indefinitely as System z disciplines and their best practices expand and evolve over time.

In embodiments of the present invention, customer adoption of IBM System z disciplines' best practices can be presented through a variety of methods including scoring, ranking, reports and visualization.

IBM System z disciplines' best practices are dynamic and evolving and can originate, be developed, and maintained through a diverse set of sources. These best practices sources can include both internal and external sources, such as IBM, business partners, OEMs, competitors, customers, external communities, organizations, bodies, governments, and more.

IBM System z disciplines' best practices can include traditional, emerging, new, and even yet to be discovered technologies. Some traditional, new, and emerging disciplines that can be utilized in embodiments include: Systems of Engagement, Systems of Record, Cloud, Analytics and Big Data, Mobile, Social, Security, Infrastructure and Internet of Things.

IBM System z disciplines' best practices are dynamic and evolving, along with customers' adoption levels. All best practices and customer adoption related information is typically stored in databases, is web application accessible, and is driven by IBM analytics to continually update customer ranks, scores, evaluations, etc., and to provide the capability for the customer, IBM, and IBM business partners to generate detailed and/or summary reports and report cards on demand. System z disciplines' best practices data and information can take many forms, all of which can be loaded into databases, coupled with IBM analytics, and visualized through Java-based and other applicable Web applications. These data forms include, without limitation: RMF; SMF; HMC; zStack middleware specific data including IMS, MQ, WebSphere, etc.; hardware instrumentation; Traces; Tivoli; Network; Storage; Problem History; Environmental, configuration, and other questionnaires; Social media (forums, blogs, communities, etc.); Structured and unstructured data; Written and verbal discussions; Internet of Things; System p data; and System x data.

Visualization of the customer adoption of IBM System z disciplines' best practices using IBM DB2 databases, Web applications, and IBM Analytics, provides on demand queries and updates and a variety of pre-defined and user customizable customer best practices adoption views/perspectives and reports capabilities. Best practices views/reports may include, without limitation: Pre-defined and user-customizable views/perspectives; Hierarchical views from individual Best Practices data points, to groups, to discipline, to overall; Pre-defined and user customizable groupings by Customers and/or Disciplines; Scoring in relative and absolute perspectives; Scoring from individual, groups, and global Customer perspectives; Ranking in relative and absolute terms; Ranking from groups and global Customer perspective; Detailed Best Practices adoption information, rank, and score by individual, multiple, or all Customers; Summary Best Practices adoption information, rank, and score by individual, multiple, or all Customers; Overall Best Practices adoption rank and score by all Customers; Detailed Best Practices information per each data point within a discipline; Detailed Best Practices information per each discipline; Detailed Best Practices adoption information, rank, and score by individual, multiple, or all disciplines; Summary Best Practices adoption information, rank, and score by individual, multiple, or all disciplines; Overall Best Practices adoption rank and score by all disciplines; Online resource information for each data point within a discipline, as well as the discipline itself, and other related disciplines—this information can include links to IBM and non-IBM web sites, manuals, white papers, red books, forums, social media, etc. where detailed IBM System z disciplines' best practices information can be found; Business intelligence on where and what Customer, IBM, and/or Business Partner resources may be needed to increase specific disciplines' rate of adoption; Business intelligence on where and what Customer, IBM, and/or Business Partner resources may be needed to increase an individual Customer's rate of adoption; and business intelligence on where and what Customer, IBM, and/or Business Partner resources may be needed to increase the overall Customer rate of adoption.

Web visualization through secure web access and content control can provide access to the above detailed and summary information on Customer and Discipline levels, to Customer and IBM resources who can partner to enhance Customer Best practices adoption. Included are the individual Customer's representatives and various IBM resources, such as: Account team; Brand; Business Partners; Client Care; Product Development/Test/Performance; Support; and others.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    performing, by a processor, an accounting of metrics relating to best practices implementation categories, wherein the best practices implementation categories comprise operational, environmental, workload, application and functional areas and wherein the best practices implementation categories are grouped by geography, country, continent and industry;
    determining, by the processor, one or more formulas that assign a score to each of the metrics relating to best practices implementation categories;
    acquiring, by the processor, relative customer best practices data using customer profiling techniques, wherein the customer profiling techniques comprise one or more of environment, workload and operational questionnaires, interviews, workshops, deep dives, problem history analysis, social media analysis and traditional media analysis;
    determining, by the processor, a score for each one of the best practices implementation categories;
    determining, by the processor, a ranking for each one of the best practices implementation categories in relation to the acquired relative customer best practices data, wherein ranking is based on an adoption and adherence to particular best practices; and
    presenting, by the processor, a visualization of the one or more formulas, the relative customer best practices data, the score for each one of the best practices implementation categories, and the ranking for each one of the best practices implementation categories, wherein the visualization is presented through secure web access and comprises content control to provide access to specified parties.

2. The computer-implemented method of claim 1 further comprising generating, by the processor, one or more reports that include the one or more formulas, the relative customer best practices data, the score for each one of the best practices implementation categories, and the ranking for each one of the best practices implementation categories.

3. The computer-implemented method of claim 1 wherein acquiring, by the processor, relative customer best practices data comprises customer profiling and analytics discipline techniques for data collection and curation.

4. The computer-implemented method of claim 1 wherein the best practices implementation categories comprise operational, environmental, workload, application and functional areas, and wherein determining, by the processor, a score for each one of the best practices implementation categories comprises determining, by the processor, a score for each of the operational, environmental, workload, application and functional areas.

5. The computer-implemented method of claim 1 further comprising storing, by the processor in one or more databases, the metrics relating to best practices implementation categories, the one or more formulas that assign a score to each of the metrics relating to best practices implementation categories, the relative customer best practices data, the score for each one of the best practices implementation categories, and the ranking for each one of the best practices implementation categories in relation to the acquired relative customer best practices data.

6. A system comprising:
a processor in communication with one or more types of memory, the processor configured to:
perform an accounting of metrics relating to best practices implementation categories, wherein the best practices implementation categories comprise operational, environmental, workload, application and functional areas and wherein the best practices implementation categories are grouped by geography, country, continent and industry;
determine one or more formulas that assign a score to each of the metrics relating to best practices implementation categories;
acquire relative customer best practices data using customer profiling techniques, wherein the customer profiling techniques comprise one or more of environment, workload and operational questionnaires, interviews, workshops, deep dives, problem history analysis, social media analysis and traditional media analysis;
determine a score for each one of the best practices implementation categories;
determine a ranking for each one of the best practices implementation categories in relation to the acquired relative customer best practices data, wherein ranking is based on an adoption and adherence to particular best practices; and
present, by the processor, a visualization of the one or more formulas, the relative customer best practices data, the score for each one of the best practices implementation categories, and the ranking for each one of the best practices implementation categories, wherein the visualization is presented through secure web access and comprises content control to provide access to specified parties.

7. The system of claim 6 wherein the processor is further configured to generate one or more reports that include the one or more formulas, the relative customer best practices data, the score for each one of the best practices implementation categories, and the ranking for each one of the best practices implementation categories.

8. The system of claim 6 wherein the processor configured to acquire relative customer best practices data comprises the processor configured to utilize customer profiling and analytics discipline techniques for data collection and curation.

9. The system of claim 6 wherein the best practices implementation categories comprise operational, environmental, workload, application and functional areas, and wherein the processor configured to determine a score for each one of the best practices implementation categories comprises the processor configured to determine a score for each of the operational, environmental, workload, application and functional areas.

10. The system of claim 6 wherein the processor is further configured to store, in one or more databases, the metrics relating to best practices implementation categories, the one or more formulas that assign a score to each of the metrics relating to best practices implementation categories, the relative customer best practices data, the score for each one of the best practices implementation categories, and the ranking for each one of the best practices implementation categories in relation to the acquired relative customer best practices data.

11. A computer program product comprising:
a non-transitory storage medium readable by a processing circuit and storing instructions for execution by the processing circuit for performing a method comprising:
performing, by a processor, an accounting of metrics relating to best practices implementation categories, wherein the best practices implementation categories comprise operational, environmental, workload, application and functional areas and wherein the best practices implementation categories are grouped by geography, country, continent and industry;
determining, by the processor, one or more formulas that assign a score to each of the metrics relating to best practices implementation categories;
acquiring, by the processor, relative customer best practices data using customer profiling techniques, wherein the customer profiling techniques comprise one or more of environment, workload and operational questionnaires, interviews, workshops, deep dives, problem history analysis, social media analysis and traditional media analysis;
determining, by the processor, a score for each one of the best practices implementation categories;
determining, by the processor, a ranking for each one of the best practices implementation categories in relation to the acquired relative customer best practices data, wherein ranking is based on an adoption and adherence to particular best practices; and
presenting, by the processor, a visualization of the one or more formulas, the relative customer best practices data, the score for each one of the best practices implementation categories, and the ranking for each one of the best practices implementation categories, wherein the visualization is presented through secure web access and comprises content control to provide access to specified parties.

12. The computer program product of claim 11 further comprising generating, by the processor, one or more reports that include the one or more formulas, the relative customer best practices data, the score for each one of the best practices implementation categories, and the ranking for each one of the best practices implementation categories.

13. The computer program product of claim 11 wherein acquiring, by the processor, relative customer best practices data comprises customer profiling and analytics discipline techniques for data collection and curation.

14. The computer program product of claim 11 wherein the best practices implementation categories comprise operational, environmental, workload, application and functional areas, and wherein determining, by the processor, a score for each one of the best practices implementation categories comprises determining, by the processor, a score for each of the operational, environmental, workload, application and functional areas.

* * * * *